United States Patent
Moon et al.

(10) Patent No.: US 7,894,860 B2
(45) Date of Patent: Feb. 22, 2011

(54) METHOD AND APPARATUS FOR DISPLAYING A PLURALITY OF IMAGES IN MOBILE TERMINAL

(75) Inventors: Jae-Won Moon, Bucheon-si (KR); Yun-Je Oh, Yongin-si (KR); Sung-Dae Cho, Yongin-si (KR); Sang-Wook Oh, Ansan-si (KR); Seok-Jin Won, Seongnam-si (KR); Young-Min Jeong, Suwon-si (KR); Jong-Man Kim, Ansan-si (KR); Hee-Won Jung, Suwon-si (KR); Jong-Hee Kim, Seongnam-si (KR)

(73) Assignee: Samsung Electronics Co., Ltd., Yeongtong-Gu, Suwon-Si, Gyeonggi-Do (KR)

( * ) Notice: Subject to any disclaimer, the term of this patent is extended or adjusted under 35 U.S.C. 154(b) by 793 days.

(21) Appl. No.: 11/897,394

(22) Filed: Aug. 30, 2007

(65) Prior Publication Data

US 2008/0108392 A1 May 8, 2008

(30) Foreign Application Priority Data

Nov. 3, 2006 (KR) .............................. 2006-108596

(51) Int. Cl.
*H04B 1/38* (2006.01)
*H04M 1/00* (2006.01)

(52) U.S. Cl. ................. 455/566; 455/550.1; 455/552.1; 455/556.2; 455/557; 455/414.1; 455/414.2; 348/333.01; 348/376; 348/14.07; 381/306

(58) Field of Classification Search ................. 455/566, 455/550.1, 552.1, 407, 556.2, 557, 414.1, 455/414.4
See application file for complete search history.

(56) References Cited

U.S. PATENT DOCUMENTS

| 7,233,807 | B2* | 6/2007 | Lim ........................ 455/556.1 |
| 7,464,333 | B2* | 12/2008 | Yamamoto .................. 715/273 |
| 7,555,308 | B2* | 6/2009 | Kim et al. ................ 455/550.1 |
| 7,602,973 | B2* | 10/2009 | Ii .............................. 382/232 |
| 2006/0083404 | A1* | 4/2006 | Shimosato .................. 382/100 |
| 2006/0088277 | A1* | 4/2006 | Lee .............................. 386/46 |
| 2006/0135219 | A1* | 6/2006 | Kim et al. ................... 455/573 |
| 2006/0190595 | A1* | 8/2006 | Kim et al. ................... 709/224 |

(Continued)

FOREIGN PATENT DOCUMENTS

KR 2002-77449 10/2002

(Continued)

*Primary Examiner*—Marceau Milord
(74) *Attorney, Agent, or Firm*—Cha & Reiter, LLC

(57) ABSTRACT

A method and an apparatus for displaying a plurality of different images in a mobile terminal in an external display device and a display unit in various modes. The mobile terminal operates according to a Different Image In and Out (DIIO) mode when the external display device is connected to the mobile terminal. When the external display device is not connected to the mobile terminal, the mobile terminal displays the plurality of different images in the display unit of the mobile terminal by operating according to a Picture-In-Picture (PIP) mode or an Overlay mode, so as to take into consideration size limitations of the display unit of the mobile terminal.

17 Claims, 4 Drawing Sheets

U.S. PATENT DOCUMENTS

| | | | |
|---|---|---|---|
| 2007/0031124 A1* | 2/2007 | Kim et al. | 386/96 |
| 2007/0035616 A1* | 2/2007 | Lee et al. | 348/14.16 |
| 2007/0293265 A1* | 12/2007 | Fei et al. | 455/556.1 |
| 2008/0046467 A1* | 2/2008 | Nakajima | 707/104.1 |

FOREIGN PATENT DOCUMENTS

| | | |
|---|---|---|
| KR | 2003-93879 | 12/2003 |
| KR | 2004-19797 | 3/2004 |
| KR | 2004-44208 | 5/2004 |
| KR | 2005-44839 | 5/2005 |
| KR | 2005-91246 | 9/2005 |
| KR | 2006-97077 | 9/2006 |

* cited by examiner

METHOD AND APPARATUS FOR DISPLAYING A PLURALITY OF IMAGES IN MOBILE TERMINAL

CLAIM OF PRIORITY

This application claims the benefit under 35 U.S.C. §119 (a) from an application entitled "Method and Apparatus for Displaying a Plurality of Images in Mobile Terminal," filed in the Korean Intellectual Property Office on Nov. 3, 2006 and assigned Serial No. 2006-108596, the contents of which are hereby incorporated by reference in its entirety.

BACKGROUND OF THE INVENTION

1. Field of the Invention

The present invention relates to a method and an apparatus for displaying in a mobile terminal. More particularly, the present invention relates to a method and an apparatus for displaying a plurality of images in a mobile terminal when a mobile terminal performs multiple functions.

2. Description of the Related Art

In a mobile terminal, such as a mobile phone or the like, there is a limitation regarding the size of a display unit for displaying an image. The reason that mobile terminals have a size limitation is that if the size of the display unit is increased or the resolution becomes high only for the size or definition of the image, mobility, which is the most important characteristic of the mobile terminal, cannot be achieved. In other words, portability considerations limit the size of a display. Therefore, the mobile terminal necessitates solutions in order to efficiently utilize limited image display resources.

Further, the display unit of a conventional mobile terminal is capable of displaying only one image for a currently executed single function among various functions provided from the mobile terminal, such as writing short text messages, searching a telephone number, operating an electronic scheduler or the like. Accordingly, if a user wishes to execute another function while the image for one function is being displayed in the display unit of the mobile terminal, the user is inconvenienced and must consider terminating the currently executed function.

Currently, with the gradual increase of multimedia services in the mobile terminal such as a broadcasting service, the time for using a moving picture through the mobile terminal by a user is increased. Accordingly, the inconvenience may be increased in that the user should terminate for watching the moving picture so as to use another function provided in the mobile terminal while using the moving picture service at the same time.

SUMMARY OF THE INVENTION

Accordingly, the present invention has been made in part to solve at least some of the above-mentioned problems occurring in the prior art. The present invention provides a method and an apparatus for displaying a plurality of images when a mobile terminal performs multiple functions at the same time.

In accordance with an exemplary aspect of the present invention, there is provided a method and an apparatus for displaying a plurality of different images through an external display device and a display unit of the mobile terminal when the external display device is connected to the mobile terminal.

In accordance with another exemplary aspect of the present invention, there is provided a method and an apparatus for displaying a plurality of different images in the display unit of the mobile terminal at the same time when the external display device is not connected to the mobile terminal.

In accordance with yet another exemplary aspect of the present invention, there is provided a method for displaying the image in the mobile terminal equipped with the display unit, the method including: checking whether or not an external display device is connected when a first image and a second image are displayed at the same time according to a performance of multiple functions; and displaying the first image through a display unit and the second image through the external display device when the mobile terminal is connected to the external display device as a result of checking In accordance with still another exemplary aspect of the present invention, there is provided a mobile terminal for displaying an image, the mobile terminal including: a display unit of a mobile terminal for displaying a first image when a first image and a second image are displayed at the same time according to a performance of multiple functions; an external display device connected with the mobile terminal for displaying the second image; an image processor for separating and outputting the first image and the second image; and a controller for controlling the image processor in order to transmit the first image to the display unit and the second image to the external display device by checking whether the external display device is connected when the multiple functions are executed.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE INVENTION

Figure 1:
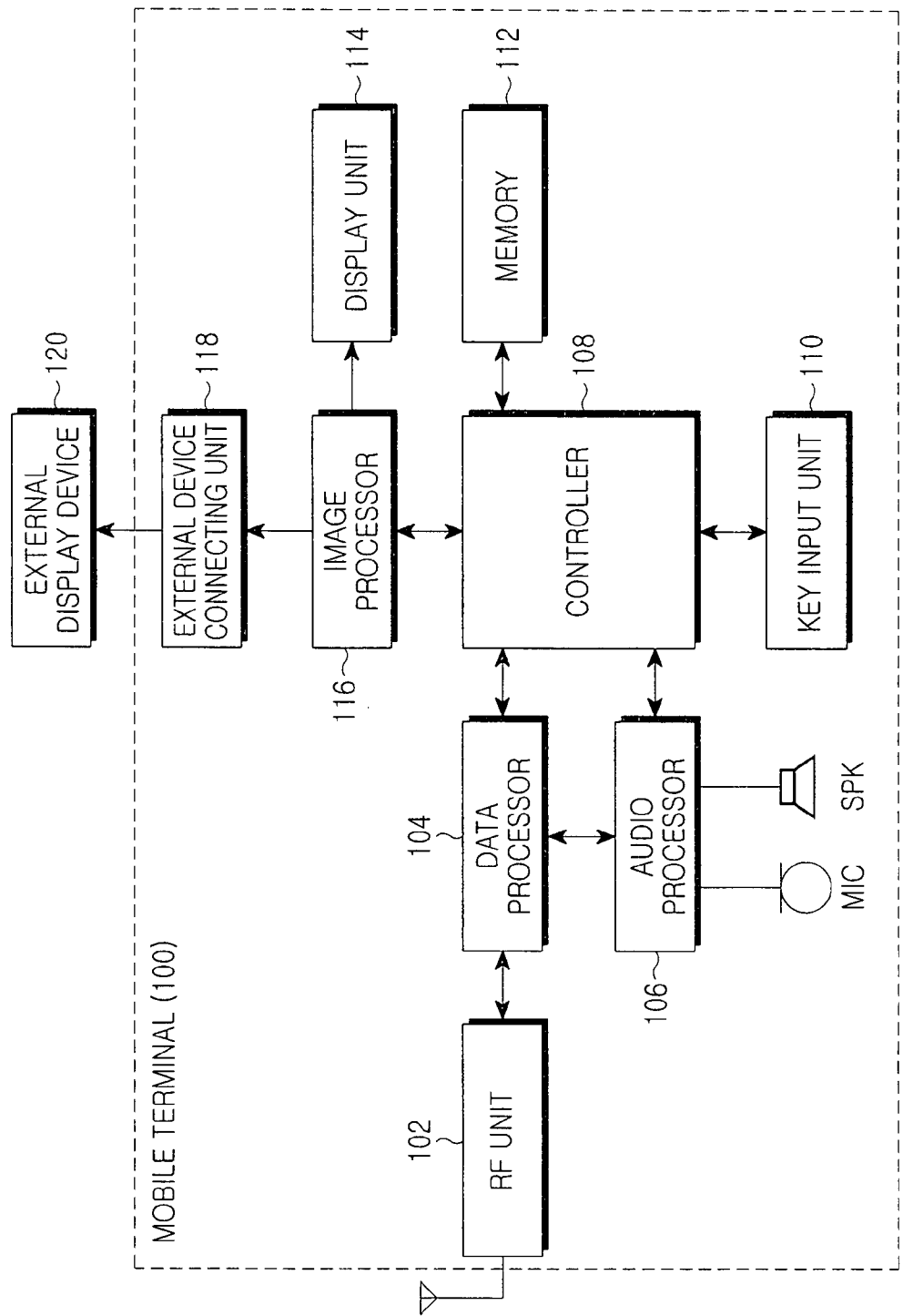
FIG. 1 is a block diagram of a mobile terminal including an external display device capable of displaying a plurality of images according to an exemplary embodiment of the present invention.

Hereinafter, exemplary embodiments of the present invention will be described with reference to the accompanying drawings. The exemplary embodiments are provided for purposes of illustration, and a person of ordinary skill in the art appreciates that the invention is not limited to the examples shown and described herein. In the following description, the same elements will be designated by the same reference numerals although they are shown in different drawings. Further, in the following description of the present invention, a detailed description of known functions and configurations incorporated herein may be omitted when such inclusion may obscure the subject matter of the present invention with the description of such known functions and configurations.

FIG. 1 is a block diagram illustrating components of a mobile terminal having a function of displaying a plurality of images according to an exemplary embodiment of the present invention. Referring to FIG. 1, a Radio Frequency (RF) unit 102 of the mobile terminal engages in frequency upward conversion for a baseband signal into a RF signal or frequency downward conversion of the RF signal into the baseband signal. A data processor 104 codes and modulates a signal transmitted through the RF unit 102, performs a function of a modem, which demodulates and decodes a signal received from the RF unit 102. An audio processor 106 converts an analog voice signal input through a microphone (MIC) into a digital voice signal and supplies the converted digital voice signal to the data processor 104. Additionally, the audio processor 106 converts the digital voice signal received from the data processor 104 into the analog voice signal and outputs the converted analog voice signal to a speaker (SPK).

A controller 108, as shown in FIG. 1, generally controls the mobile terminal apparatus, and in case of performing multiple functions, the controller 108 controls an operation of an image processor so as to output a plurality of output images through a display unit 114 and/or an external display device 120 according to a display mode described later. A key input unit 110 is provided with alphanumeric keys for inputting characters or numbers and function keys for setting various functions.

Still referring to FIG. 1, a memory 112 may be provided with a Read Only Memory (ROM) and a Random Access Memory (RAM). Various temporary data generated during the processes of the controller 108, and user's data or the like, are stored in a memory 112.

The display unit 114 displays an image signal output from an image processor 116. The image processor 116 generates data in order to display the image signal that is output through at least one of the display unit 114 and the external display device 120 under the control of the controller 108. Further, the image processor 116 outputs the image signal output to the display unit 114 or the external display device 120 according to its appropriate characteristic and size. An external device connecting unit 118 is a connection port for connecting the external display device 120 to the mobile terminal, and which can be provided with, for example, a Universal Serial Bus (USB) port, an Institute of Electrical and Electronics Engineers (IEEE) 1394 port, a serial port or any other type of port. Furthermore, the external device connecting unit 118 wirelessly transmits the image signal in case of using an infrared port or the like. The external display device 120 includes a connection terminal connecting with the external device connecting unit 118, and can uses various external devices, such as a monitor, a Personal Digital Assistant (PDA), a projector or the like.

Figure 2:
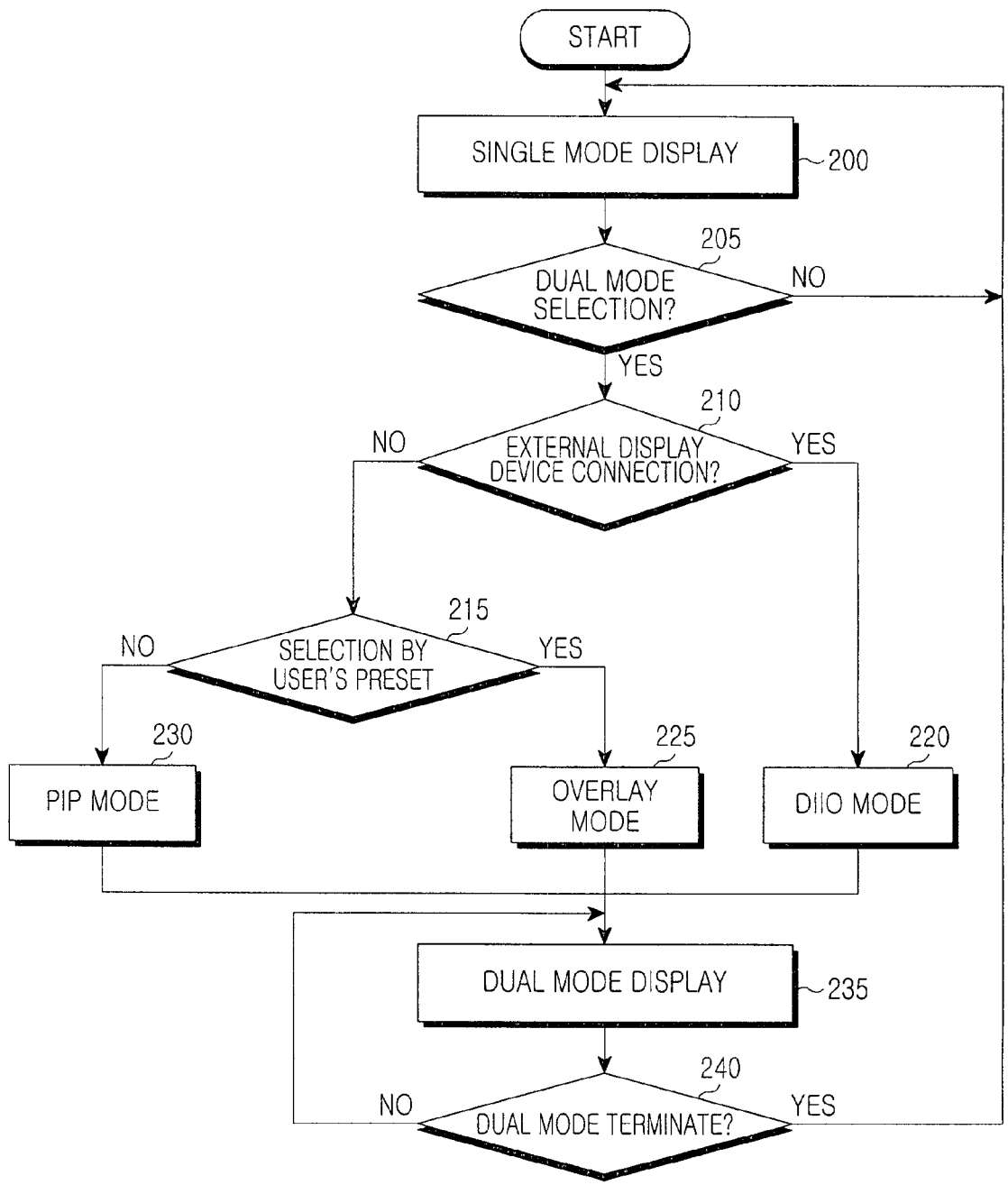
FIG. 2 is a flowchart illustrating a method of displaying a plurality of images in a mobile terminal according to an exemplary embodiment of the present invention.

FIG. 2 is a flowchart illustrating a method of displaying a plurality of images in the mobile terminal according to an exemplary embodiment of the present invention. Referring to FIG. 2, in step 200, the current mobile terminal will be described on the assumption that it is in a state of performing a single mode display function and displaying a first image in a single mode. In step 205, the controller checks whether a dual mode, which displays a plurality of images, is selected when multiple functions are executed according to a user's key manipulation, or receipt of external data. Hereinafter, an operational mode of displaying a single image according to the execution of a single function is referred to as a 'single mode', and an operational mode of displaying a plurality of images according to the execution of multiple functions is referred to as a 'dual mode'. In step 205, the dual mode can be preset by the user of the mobile terminal, or by providing a dialog box asking the user whether or not to select the mode as well. If the dual mode is not selected, the state of displaying the single image in the single mode is typically maintained as a default. For convenience of description, hereinafter, the plurality of images are divided into a first image and a second image.

The first image and the second image are displayed through the display unit 114 and/or the external display device 120 (both shown in FIG. 1) according to three display modes described as follows.

Still referring to FIG. 2, the first display mode is referred to as a Different Image In and Out (DIIO) mode, hereinafter called 'DIIO mode'. The DIIO mode is a scheme of displaying the first image and the second image provided from the mobile terminal in the external display device and the display unit of the mobile terminal, respectively, when the mobile terminal is connected with the external display device.

The second display mode is a Picture In Picture (PIP) mode, hereinafter called 'PIP mode'. The PIP mode refers to a scheme of displaying a smaller image inside of a bigger image. The PIP mode is the scheme of which, when the mobile terminal is not connected to the external display device, between the first image and the second image provided from the mobile terminal, the first image is displayed in the display unit of the mobile terminal, and the second image generated smaller than the first image is displayed in an arbitrary region of the first image.

The third display mode is an overlay mode. The overlay mode refers to adjusting the transparency ratio of the signal image provided from the mobile terminal, arranging the image to be overlapped with another image, and displaying two images in one screen at the same time. That is, the overlay mode is a scheme of which, when the mobile terminal is not connected to the external display device, the first image provided from the mobile terminal is displayed in the display unit, and the second image is made transparent and is displayed on the first image being overlapped.

In the three display modes, the first image and the second image can include a plurality of images respectively, and be exchanged.

Now, referring again to the flowchart shown in FIG. 2, if the dual mode display is selected in step 205, the controller 108 (shown in FIG. 1) determines in step 210 whether the external display device 120 is connected to the mobile terminal. If the external display device 120 is connected to the mobile terminal, in step 220 the controller 108 performs the DIIO mode. When the DIIO mode is executed, the first image and the second image are displayed via the designated/selected route of the external display device 120 and the display unit 114, respectively.

Still referring to the flowchart in FIG. 2, if the external display device 120 is not connected to the mobile terminal, the controller 108 performs the overlay mode of step 225 or the PIP mode of step 230 according to the user's choice in step 215. The decision as whether or not to select between the overlay mode and the PIP mode may be preset by the user or by providing a dialog box prompting about selection.

In step 235, the dual mode display is performed according to the mode selected mode in one of steps 220, 225 or 230. When the dual mode display is terminated in step 240, the single mode display of step 200 is performed, and if not, the dual mode display is continuously performed.

Hereinafter, each of the display modes will be described in detail according to an exemplary embodiment of the present invention. An image requiring a user's interface for displaying the first image and the second image by a keyed operation of the user, e.g., an image for text messages, refers to a main image, and an image not requiring the user's interface, e.g., a multimedia moving picture, refers to a sub-image, because an arrangement and a size of the image is varied in the respective display modes according to whether the image for displaying necessitates the user's interface or not. Therefore, the first image or the second image can be the main image or the sub-image, respectively.

Figure 3:
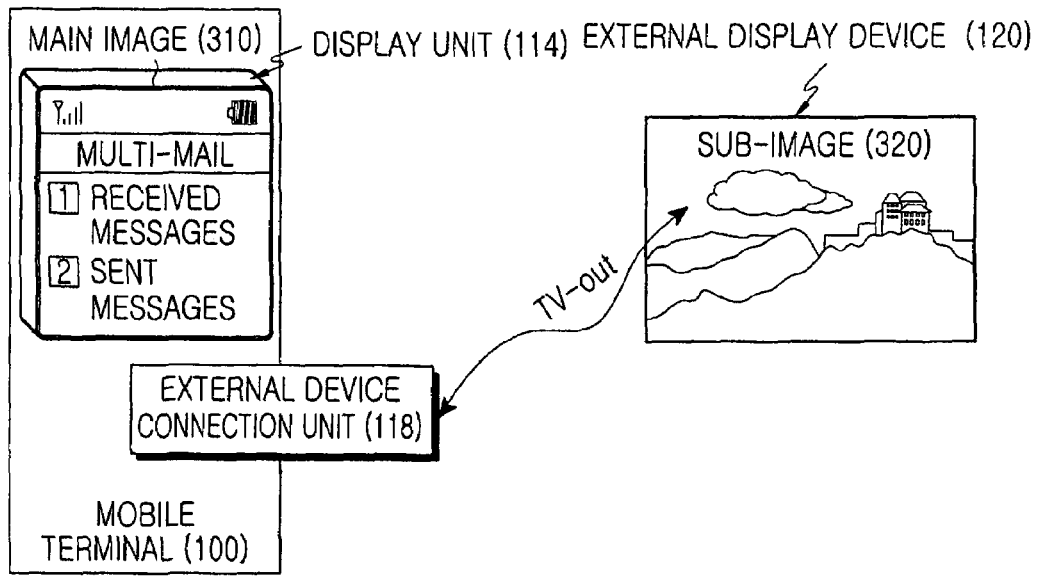
FIG. 3 illustrates an operation state of a DIIO mode according to an exemplary embodiment of the present invention.

FIG. 3 illustrates the operating state of the DIIO mode according to an exemplary embodiment of the present invention. More particularly, in FIG. 3, it is assumed that the image for transmitting the text messages is displayed at the same time during displaying the multimedia moving picture in the display unit 114 of the mobile terminal 100. Referring to FIGS. 1 and 3, the controller 108 of the mobile terminal 110 determines if each of the images for transmitting the multimedia moving picture and the text messages is the main image or the sub-image. The multimedia moving picture is the sub-image 320 because it does not currently require the user's interface. The image for transmitting the text messages is the main image 310 because it requires the user's interface. Accordingly, the main image is displayed in the display unit 114 of the mobile terminal 100 for the user's interface, and the sub-image 320 is displayed in the external display device 120 connected by the external device connecting unit 118. The controller 108 performs hooking the image signal corresponding to the sub-image 320 among the image signals output from the image processor 116 and transmits them to the external display device 118 so as to display the sub-image 320 in the external display device 120. While the described external device connecting unit 118 and the external display device 120 are connected by a wire, however, a person of ordinary skill in the art understands that the connected can be made wirelessly in lieu thereof.

Figure 4:
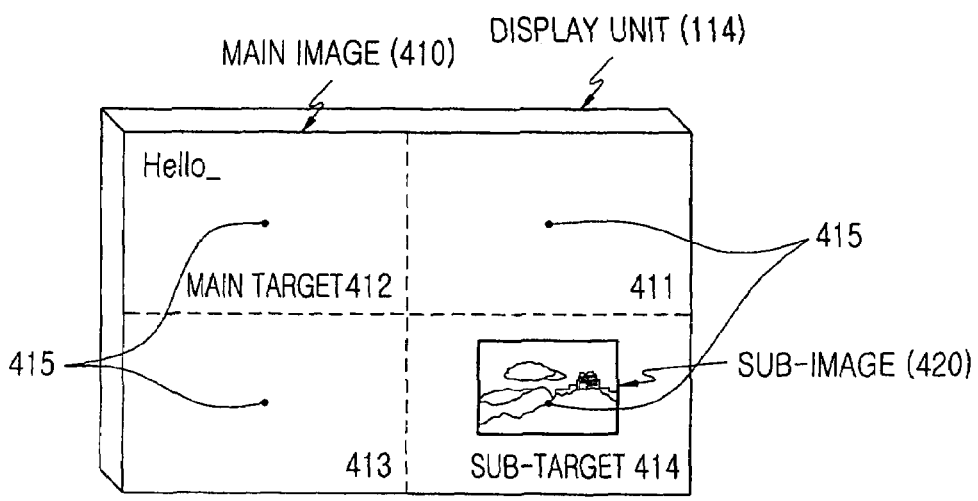
FIG. 4 illustrates an operation state of a PIP mode according to an exemplary embodiment of the present invention.

FIG. 4 illustrates the operating state of the PIP mode according to an exemplary embodiment of the present invention. In FIG. 4, it is assumed the situation that the image for transmitting the text messages is displayed at the same time during displaying the multimedia moving picture in the display unit 114 of the mobile terminal 100.

Referring to FIG. 4, when the mobile terminal is not connected to the external display device 120, the controller 108 of the mobile terminal determines whether each of the images for transmitting the multimedia moving picture and the text messages is the main image or the sub-image (sub-image). The multimedia moving picture is the sub-image 420 because it does not currently require the user's interface. The image for transmitting the text messages is the main image 410 because it requires the user's interface.

In the example shown in FIG. 4, the controller 108 controls the image processor 116 and displays the main image 410 as an identical size as that of the display unit 114, and the sub-image as the preset size. It may be possible to provide the user's interface that can adjust the size of the main image 410 and the sub-image 420.

In the meantime, the main image requires the user's interface so that an effect of the sub-image on the user's interface of the main image should be minimized. Accordingly, the controller 108 of the present invention detects an optimum region of the display unit 114 in which the sub-image is displayed. The example of the process of detecting the optimum region will be described in detail as below. The controller 108 divides the display unit into four identical regions. The common text in the main image for inputting the text messages is input from leftward to rightward or from upward to downward of the display unit 114 so that the second quadrant among quadrants of the image is the region necessitating the user's interface, hereinafter, called a 'main target'.

The controller 108 detects a position of a current cursor in order to detect the main target. The quadrant in which the cursor is located is the main target 412. The cursor can be replaced with another means indicating the region used for the user's interface. The controller 108 should detect the region in which the sub-image 420 is displayed, hereinafter, called a 'sub-target'. As shown in above, the effect of the sub-target on the main target should be minimized, and the sub-target is detected through the following process. The controller 108 detects a center point 415 of the respective quadrants. Comparing the distance between the respective quadrants and the center point of the main target, the quadrant in which the center point is located having the greatest distance difference becomes the sub-target. In FIG. 3, the main target is located in the second quadrant 412 so that the sub-target is the fourth quadrant 414 according to the detecting process. In the exemplary embodiment of the present invention, it is explained that the display unit 114 is divided into four regions, however, the sub-target may be detected by a method of dividing the display unit into equal to or more than four division regions according to the same method of the described detecting process. Further, the sub-target may be detected by other methods rather than that of dividing the display unit 114.

Figures 5A, 5B:
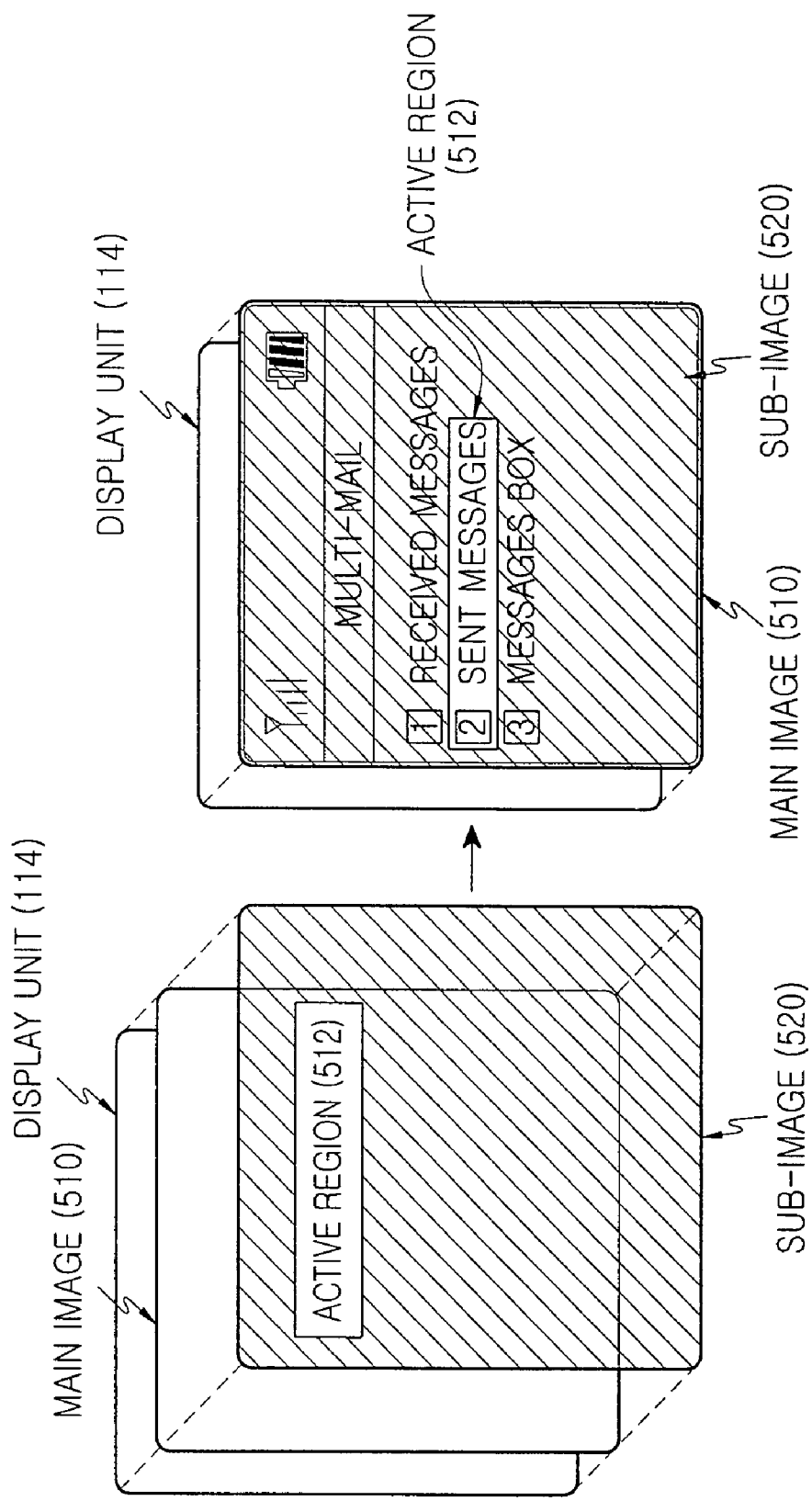
FIGS. 5A and 5B illustrate an operational state of an overlay mode according to an exemplary embodiment of the present invention.

FIGS. 5A and 5B illustrate the operating state of the overlay mode according to an exemplary embodiment of the present invention. Referring to FIG. 5A, it is assumed the situation that the image for transmitting the text messages is displayed at the same time during displaying the multimedia moving picture in the display unit 114 of the mobile terminal. Referring to FIG. 5A, when the mobile terminal is not connected to the external display device 120, the controller 108 of the mobile terminal (not shown in FIG. 5A) determines if each of the images for transmitting the multimedia moving picture and the text message is the main image 510 or the sub-image 520. In this example, the moving picture is the sub-image 520 because it does not currently require the user's interface. The image for transmitting the text messages is the main image 510 because it requires the user's interface.

Still referring to FIGS. 1 and 5A, the image processor 116 displays the main image 510 in the display unit 114, adjusts the transparency of the sub-image 520 and displays the transparent sub-image overlapped/overlaid with the main image. While the quantity of the transparency can be preset as a predetermined value, however, preferably, it can be set as a default value by which the sub-image is more visually displayed (more of the sub-image) to the user than the main image due to the overlapping.

The controller 108 detects an active region 512 selected for the user to operate in the main image, and the image processor 116 makes the overlaid sub-image 520 in the active region 512 transparent. While the quantity of the transparency can be preset as the predetermined value, however, preferably, it can be set as a default value by which the active region 512 is more visually displayed to the user than the sub-image 520 due to the overlapping.

Through the described exemplary process, the active region 512 of the main image 510 is more visually displayed than the sub-image 520 so that it can be an appropriate region for the user's operation. Additionally, the remaining regions rather than the active region in the sub-image 520 is more visually displayed than the main image 510 so that the user can perform the operation in the active region 512 while watching the sub-image 520.

FIG. 5B illustrates the state of displaying the image for transmitting the text messages in response to FIG. 5A, according to an exemplary embodiment of the present invention.

As shown in FIG. 5B, the active region 512 is the region indicating '2 Sent Messages' in the image for selecting the text messages.

As such, the present invention displays a plurality of images through the display unit and/or the external display device of the mobile terminal. Accordingly, the present invention can efficiently use the resources of the display unit for displaying the image in the mobile terminal and use another function provided from the mobile terminal at the same time during displaying of the single image thereby improving the user's convenience.

While the invention has been shown and described with reference to certain exemplary embodiments thereof, it will be understood by those skilled in the art that various changes in form and details may be made therein without departing from the spirit of the invention and the scope of the appended claims. For example, the term "key input" does not require a physical key button, and can be a portion of a touch-screen display configured to activate or select a particular mode or function

What is claimed is:

1. A method for displaying an image in a mobile terminal equipped with a display unit, the method comprising the steps of:
   (a) determining whether or not an external display device is connected to the mobile terminal when a first image and a second image are displayed at the same time according to a performance of multiple functions of the mobile terminal;
   (b) determining the first image as that image requiring a user's interface and determining the second image as that image not requiring a user's interface; and
   (c) displaying the first image through the display unit of the mobile terminal and the second image through the external display device when the mobile terminal is connected to the external display device as a result of the determining in step (a).

2. The method according to claim 1, further comprising: transmitting the second image to the external display device through the external device connecting unit.

3. The method according to claim 1, wherein at least one of the first image and the second image comprises a plurality of images.

4. The method according to claim 1, further comprising a sub-step of displaying the first image and the second image in the display unit at the same time according to a Picture-In-Picture (PIP) mode when the external display device is not connected as the result of the determining in step (a).

5. The method according to claim 4, wherein step (b) further comprising the sub-steps of:
   (i) generating the first image as an identical size with that of the display unit in the PIP mode;
   (ii) generating the second image as a predetermined size which is in a range less than a size of the first image; and
   (iii) detecting a sub-target in the display unit in which the second image is displayed.

6. The method according to claim 5, wherein the detecting of the sub-target further comprises the sub-steps of:
   dividing the display unit into at least four division regions having an identical size;
   detecting a main target in the divided region in which a means indicating a performance of the users interface in the display unit is located;
   measuring a distance between center points of the divided regions and a center point of the main target; and
   detecting the corresponding divided region having the greatest distance difference value among the measured distance values as the sub-target.

7. The method according to claim 1, further comprising a step of adjusting transparency of the second image and displaying the second image on the first image being overlaid when the external display device is not connected as the result of the determining in step (a).

8. The method according to claim 7, further comprising the steps of:
   detecting an active region which requires an input by a user in the first image; and
   making the second image transparent in the active region.

9. A mobile terminal for displaying an image comprising:
   a display unit of a mobile terminal for displaying a first image when a first image and a second image are displayed at the same time according to a performance of multiple functions by the mobile terminal;
   an external device connecting unit for transmitting the second image to an external display device;
   an image processor for separating and outputting the first image and the second image; and
   a controller for controlling the image processor in order to transmit the first image to the display unit and the second image to the external display device connecting unit by determining whether the external display device is connected to the mobile terminal before the multiple functions are executed, wherein the first image is determined as an image requiring a user interface and the second image is determined as an image not requiring a user interface.

10. The mobile terminal according to claim 9, further comprising an external display device connected with the mobile terminal for displaying the second image.

11. The mobile terminal according to claim 10, wherein at least one of the first image and the second image comprises a plurality of images.

12. The mobile terminal according to claim 10, wherein the external display device is connected to the mobile terminal, the controller controls the image processor to operate in a dual mode in which the second image is transmitted to the external display device via the external device connecting unit until a single mode display is selected.

13. The mobile terminal according to claim 9, wherein the controller displays the first image and the second image in the display unit at the same time according to a Picture-In-Picture (PIP) mode when the external display device is not connected to the mobile terminal.

14. The mobile terminal according to claim 13, wherein the controller further controls the image processor for generating the first image as an identical size with that of the display unit in the PIP mode, generating the second image as a predetermined size which is in a range less than the size of the first image; and detecting a sub-target in the display unit in which the second image is displayed.

15. The mobile terminal according to claim 14, wherein the controller further dividing the display unit into at least four divided regions having an identical size in order to detect the sub-target, detecting a main target in the division region in which a means indicating a performance of the user's interface in the display unit is located, measuring a distance between center points of the division regions and a center point of the main target, and detecting the divided region having the greatest distance difference value among the measured distance values as the sub-target.

16. The mobile terminal according to claim 9, wherein the controller further controls the image processor for adjusting transparency of the second image and displaying the second image on the first image being overlaid in an overlay mode when the external display device is not connected to the mobile terminal.

17. The mobile terminal according to claim 9, wherein the controller further controls the image processor for detecting an active region which requires an input from a user in the first image, and rendering the second image to be transparent in the active region.

* * * * *